WILLIAM R. McFARLAND.
Improvement in Flood-Fences.
No. 127,083. Patented May 21, 1872.
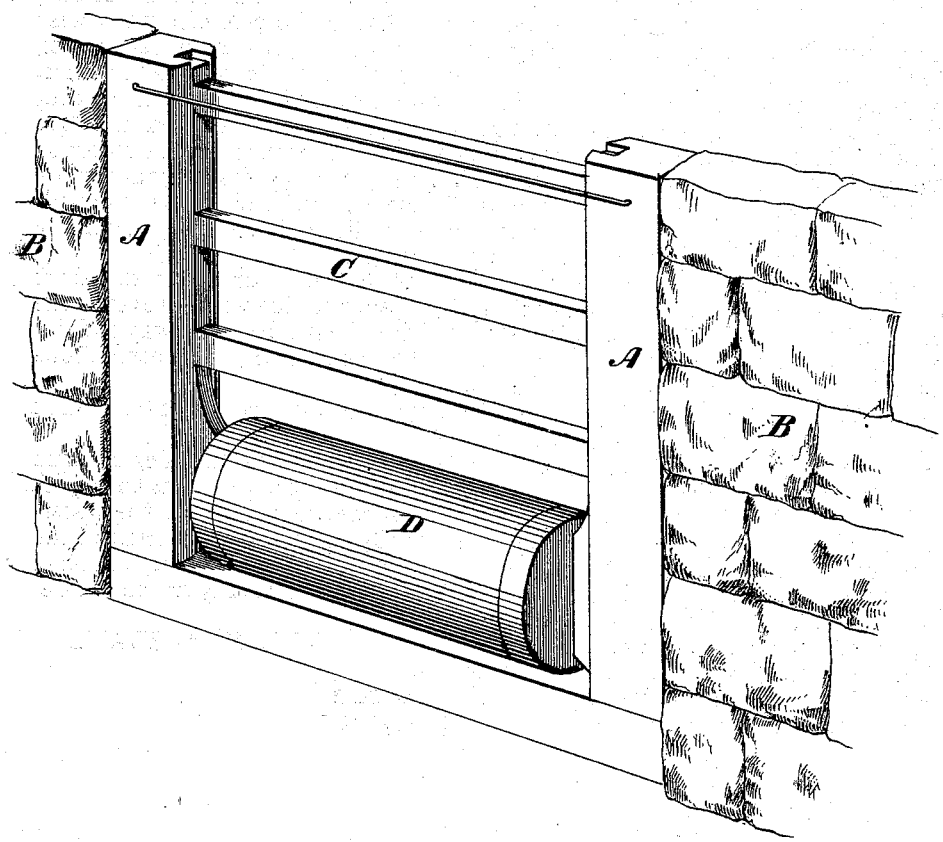
Witnesses.
Inventor:
Wm. R. McFarland
By his attys.

UNITED STATES PATENT OFFICE.

WILLIAM R. McFARLAND, OF PARIS, TENNESSEE.

IMPROVEMENT IN FLOOD-FENCES.

Specification forming part of Letters Patent No. 127,083, dated May 21, 1872.

*To all whom it may concern:*

Be it known that I, WILLIAM R. MCFARLAND, of Paris, in the county of Henry, State of Tennessee, have invented a new and Improved Water-Gap; and I do hereby declare the following to be a full, clear, and exact description of the same, reference being had to the accompanying drawing forming part of this specification, in which—

The figure is a perspective view of my improved water-gap applied to a wall or fence.

My invention has for its object to provide an improved water-gap for fences, walls, &c., situated in low ground or across the bed of a brook or stream. The invention consists in providing the gap with a large drum or roller mounted in a sliding frame so that it shall float upon the water, and be rotated by the current of the latter to feed drift and other impediments through the gap, and thereby prevent the fence or wall from being injured or broken away by the accumulation of obstacles behind it. It further consists in constructing the sliding frame in such a manner as to form a gate for the gap when the water has ceased flowing to prevent the entrance of cattle, &c., through the fence or wall.

In the accompanying drawing, A is a frame of suitable construction set securely into a fence or wall, B, across the channel of a brook or other stream, or in ground liable to be submerged, or partially submerged, at certain seasons of the year. C is a frame constructed with cross-bars in the form of a gate, and arranged to slide vertically in grooves formed in the uprights of the frame A; and D is a large drum or roller journaled in the lower end of the gate, as shown in the drawing. When little or no water is flowing through the gap the drum D rests upon the sill of the frame A, while the cross-bars of the gate effectually close the gap to prevent the passage of cattle, &c., from one side of the fence or wall to the other.

When, however, a body of water is pouring through the gap the gate is lifted, and the drum floats upon the surface of the water so that it shall be rotated by the current for the purpose of allowing drift and other substances to pass under it through the gap, as will be readily understood.

The rotation of the drum feeds the drift through the gap, and therefore prevents the fence or wall from being broken away and destroyed by the accumulation of obstructions behind it.

Having thus described my invention, what I claim, is—

A water-gap provided with a roller or drum mounted in a sliding gate, so that both gate and drum shall rise and fall with the water, while the drum is rotated by the current of the same, to feed drift and other impediments through the gap, substantially as herein described.

W. R. McFARLAND.

Witnesses:
T. M. EDGAR,
R. R. AYCOCK.